(12) United States Patent
Morris (10) Patent No.: US 11,305,727 B2
(45) Date of Patent: Apr. 19, 2022

(54) THREE-POINT SEAT BELT ANCHOR ASSEMBLY AND METHODS OF INSTALLATION THEREFOR

(71) Applicant: Billy Gene Morris, Greer, SC (US)

(72) Inventor: Billy Gene Morris, Greer, SC (US)

(*) Notice: Subject to any disclaimer, the term of this patent is extended or adjusted under 35 U.S.C. 154(b) by 72 days.

(21) Appl. No.: 16/789,837

(22) Filed: Feb. 13, 2020

(65) Prior Publication Data
US 2020/0180552 A1    Jun. 11, 2020

Related U.S. Application Data

(63) Continuation-in-part of application No. 15/731,534, filed on Jun. 26, 2017, now abandoned.

(51) Int. Cl.
*B60R 22/18* (2006.01)
*B60R 22/02* (2006.01)
*B60R 22/34* (2006.01)

(52) U.S. Cl.
CPC ............ *B60R 22/18* (2013.01); *B60R 22/023* (2013.01); *B60R 22/34* (2013.01); *B60R 2022/3427* (2013.01)

(58) Field of Classification Search
CPC .... A44B 11/2549; A44B 11/25; B60R 22/023
See application file for complete search history.

(56) References Cited

U.S. PATENT DOCUMENTS 5,207,453 A * 5/1993 Stedman ................. B60R 22/18
280/808
5,881,458 A * 3/1999 Wolf .................... B62D 25/087
29/897.2

OTHER PUBLICATIONS

"3-Point Conversion Seatbelt Installation Guide for: 1965-1973 Mustang FRONT Coupe.Convertible/Fastback," Seatbelt Solutions, Jul. 2014. (Year: 2014).*
"Custom 3-Point Seatbelt Installatin Guide for: 1964-1975 GM/Chevrolet," RetroBeltUSA, 2007 (Year: 2007).*

* cited by examiner

*Primary Examiner* — Sarah B McPartlin
(74) *Attorney, Agent, or Firm* — Burr & Forman LLP; Douglas L. Lineberry (57) ABSTRACT

A three-point installation bracket for converting a two-point seat belt system included factory in a convertible vehicle to a three-point seat belt system without requiring modifications/changes to the existing vehicle frame. The disclosure also includes methods for installing the bracket, as well as kits including same.

14 Claims, 13 Drawing Sheets

THREE-POINT SEAT BELT ANCHOR ASSEMBLY AND METHODS OF INSTALLATION THEREFOR

BACKGROUND OF THE INVENTION

1) Field of the Invention

The present invention relates to a three-point convertible seat belt anchor assembly that creates a seat belt shoulder strap in convertible vehicles that lack such a strap. The disclosure also includes methods of retrofitting vehicles to add the seat belt shoulder strap to classic cars as well as kits for same.

2) Description of Related Art

Previously, convertible cars only had a 2-point seat belt assembly. They did not include an anchor point above the shoulder for a 3-point seat belt system when they were assembled in the factory.

Prior devices, such as that disclosed in Adams '842, U.S. Pat. No. 3,369,842, are not suitable for convertible vehicles. Adams '842 requires the installation of the shoulder belt securement means into the upper frame of the car adjacent the user's head, which axiomatically does not exist in a convertible vehicle, especially when the convertible top is not deployed.

Accordingly, it is an object of the present invention to provide a bracket that forms the third anchor point above the shoulder for the seat belt webbing mount to attach in the structure of the car. This will accommodate a 3-point seat belt system as the seat belt webbing goes over the passenger's shoulder and chest. The current disclosure improves user safety as well as does not impact the design or aesthetics of the vehicle.

SUMMARY OF THE INVENTION

The above objectives are accomplished according to the present disclosure in a first embodiment via a method for installing a three-point seat belt harness into a convertible vehicle. The method may include removing at least one side panel from a vehicle to reveal a section of a frame of the vehicle, removing at least one bolt from the frame of the vehicle to provide an at least partially empty bolt hole in the frame of the vehicle, installing a first three-point installation bracket having a contour profile that aligns with the at least one empty bolt hole, installing a three-point seat belt reel into the vehicle, mounting a convertible seat belt assembly to the three-point installation bracket, and mounting a seat belt push button into the vehicle. Still, the method may include a shoulder harness of a seat belt remains in place when the vehicle has a convertible roof stored or otherwise removed. Again, the contoured profile may be configured to match a specific make and model of vehicle. Yet further, the three-point seat belt reel may be configured to be secured via insertion of bolts into bolt holes used to secure a two point seat belt in the vehicle. Still again, the seat belt push button may be affixed to an inner mounting hole for a two point seat belt system of the vehicle. Further yet, a second three-point installation bracket may be installed into the vehicle. Still further, the convertible seat belt assembly may affix to a shoulder belt engagement ledge of the three-point installation bracket. Further yet, the three-point installation bracket affixment point to the vehicle frame does not change position when the convertible vehicle activates or otherwise repositions a convertible roof.

In a further embodiment, a three-point installation bracket is provided. The bracket may include a bracket body having a contoured profile having at least one orifice configured to match at least one existing hole in a vehicle interior, a shoulder harness engagement ledge; a support arm; at least one positioning ledge; and at least one engagement orifice for engaging the at least one existing hold in the vehicle frame. Still yet, there may be at least two positioning ledges. Further, the three-point installation bracket affixment point to the vehicle frame does not change position when a convertible vehicle activates or otherwise repositions a convertible roof. Again, the contoured profile may configured to match a specific make and model of vehicle. Further again, a second orifice may be configured to match at least one second existing hole in the vehicle interior.

In a still further embodiment, the current disclose provides a kit for converting a two point seat belt harness in a convertible vehicle to a three-point harness comprising. The kit may include at least one three-point installation bracket having a contoured profile having at least one orifice configured to match at least one existing hole in a vehicle interior where the contoured profile may configured to match a specific make and model of vehicle, at least one convertible three-point seat belt reel; and at least one seat belt push button end. Further, the three-point seat belt reel is configured to have a shoulder belt configured to engage a shoulder belt engagement ledge of the at least one three-point installation bracket.

BRIEF DESCRIPTION OF THE DRAWINGS

The construction designed to carry out the invention will hereinafter be described, together with other features thereof. The invention will be more readily understood from a reading of the following specification and by reference to the accompanying drawings forming a part thereof, wherein an example of the invention is shown and wherein.

It will be understood by those skilled in the art that one or more aspects of this invention can meet certain objectives, while one or more other aspects can meet certain other objectives. Each objective may not apply equally, in all its respects, to every aspect of this invention. As such, the preceding objects can be viewed in the alternative with respect to any one aspect of this invention. These and other objects and features of the invention will become more fully apparent when the following detailed description is read in conjunction with the accompanying figures and examples. However, it is to be understood that both the foregoing summary of the invention and the following detailed description are of a preferred embodiment and not restrictive of the invention or other alternate embodiments of the invention. In particular, while the invention is described herein with reference to a number of specific embodiments, it will be appreciated that the description is illustrative of the invention and is not constructed as limiting of the invention. Various modifications and applications may occur to those who are skilled in the art, without departing from the spirit and the scope of the invention, as described by the appended claims. Likewise, other objects, features, benefits and advantages of the present invention will be apparent from this summary and certain embodiments described below, and will be readily apparent to those skilled in the art. Such objects, features, benefits and advantages will be apparent from the above in conjunction with the accompanying examples, data, figures and all reasonable inferences to be drawn therefrom, alone or with consideration of the references incorporated herein.

DETAILED DESCRIPTION OF A PREFERRED EMBODIMENT

With reference to the drawings, the invention will now be described in more detail. Unless defined otherwise, all technical and scientific terms used herein have the same meaning as commonly understood to one of ordinary skill in the art to which the presently disclosed subject matter belongs. Although any methods, devices, and materials similar or equivalent to those described herein can be used in the practice or testing of the presently disclosed subject matter, representative methods, devices, and materials are herein described.

Unless specifically stated, terms and phrases used in this document, and variations thereof, unless otherwise expressly stated, should be construed as open ended as opposed to limiting. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise.

Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent.

The Three-Point Convertible Seat Belt Anchor Assembly may be laser cut from stainless steel, or carbon steel, and bent to specific dimensions on a metal brake machine. The Seat Belt Anchor Assembly may be bolted into the structure of the vehicle, providing the third point for a three-point seat belt system, as many cars from this era only have a two-point seat belt assembly.

Figure 9:
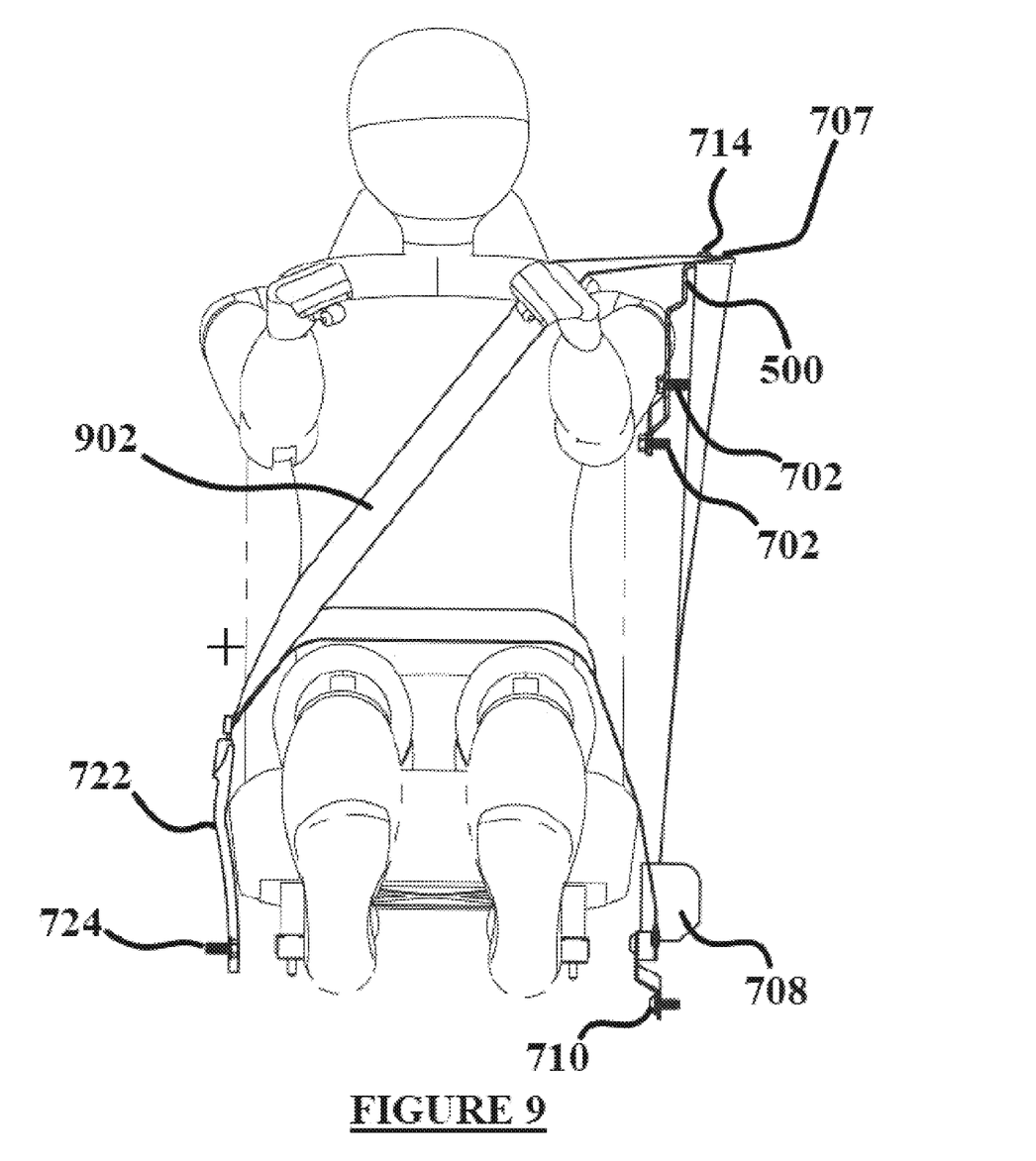
FIG. 9 shows a front view of a three-point installation bracket of the current disclosure installed in a vehicle.

The Three-Point Convertible Seat Belt Anchor Assembly is unique because the bracket's design facilitates the ability to mount a three-point retractable seat belt system. The webbing of the seat belt will rest higher on the shoulder of the passenger(s), creating a safer angle across the torso which will restrain the passenger(s) in the event of a vehicular collision. As shown in FIG. 9, the shoulder belt crosses over the left shoulder of the driver and across the chest when installed, creating a comfortable and safe seat belt securement. Further, see FIG. 10, bracket 500 is not installed onto the roof or upper sides of the vehicle as these structures do not exist in a convertible vehicle. The essence of a convertible being to have these structures recess or otherwise fold away from the driver, thus making them unavailable for use as an affixment location for a shoulder belt and accompanying affixment system.

Figure 1:
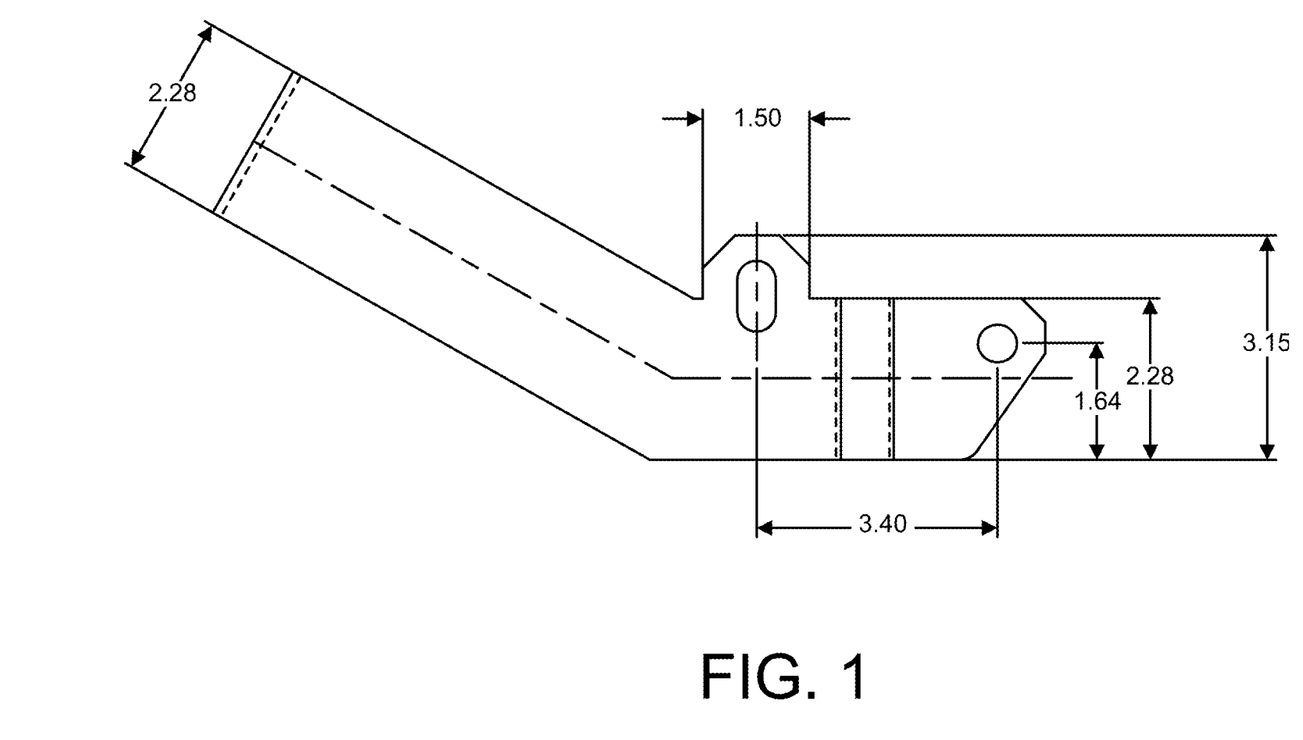
FIG. 1 depicts the top view of seat belt anchor brackets of the current disclosure for a GM A-body and similar automobiles.
Figure 2:
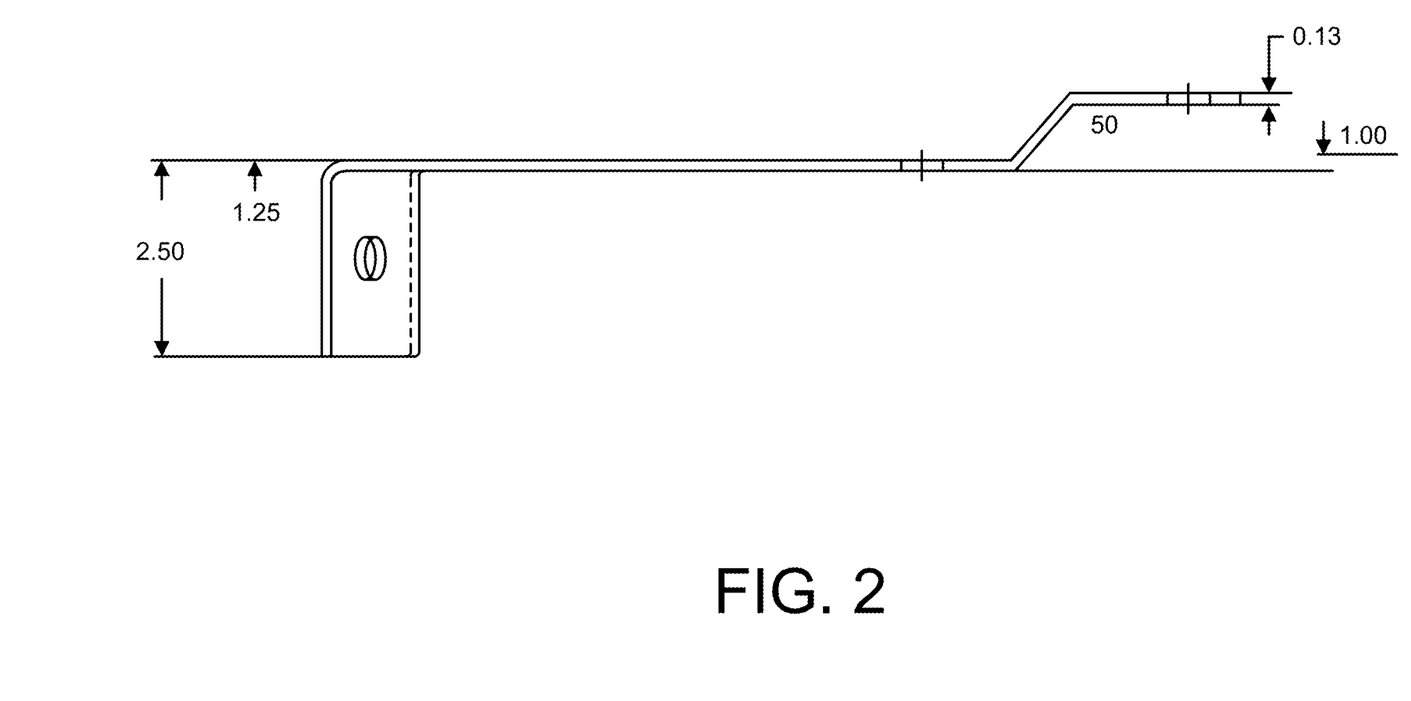
FIG. 2 depicts the side view of the seat belt anchor brackets of the current disclosure for a GM A-body and similar automobiles.
Figure 3:
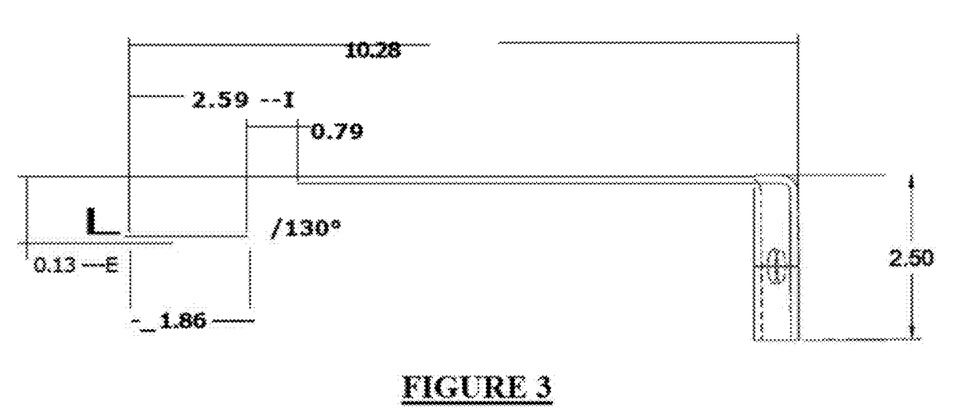
FIG. 3 depicts the top view of the seat belt anchor brackets of the current disclosure for GM F-body and similar automobiles.
Figure 4:
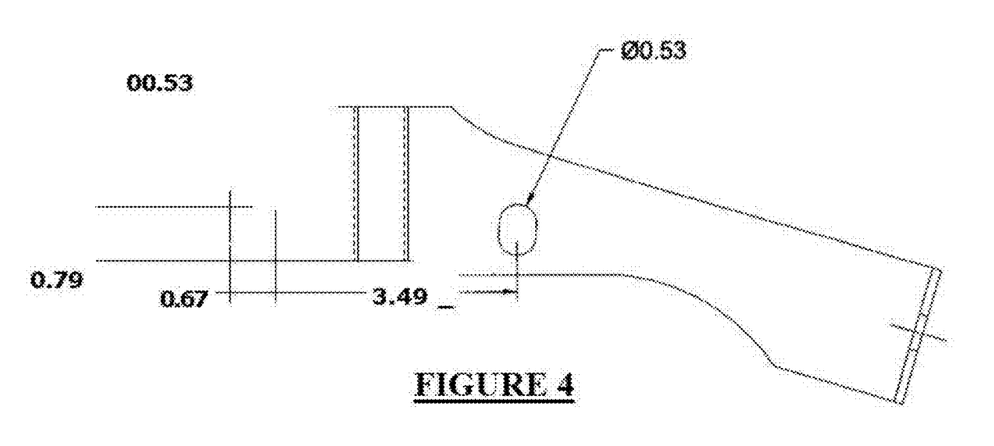
FIG. 4 depicts the side view of the seat belt anchor brackets of the current disclosure for GM F-body and similar automobiles.
Figure 5:
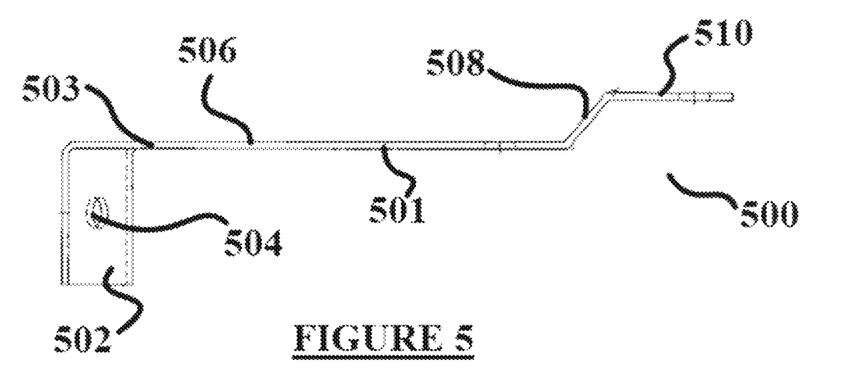
FIG. 5 shows a side view of a three-point installation bracket of the current disclosure.
Figure 6:
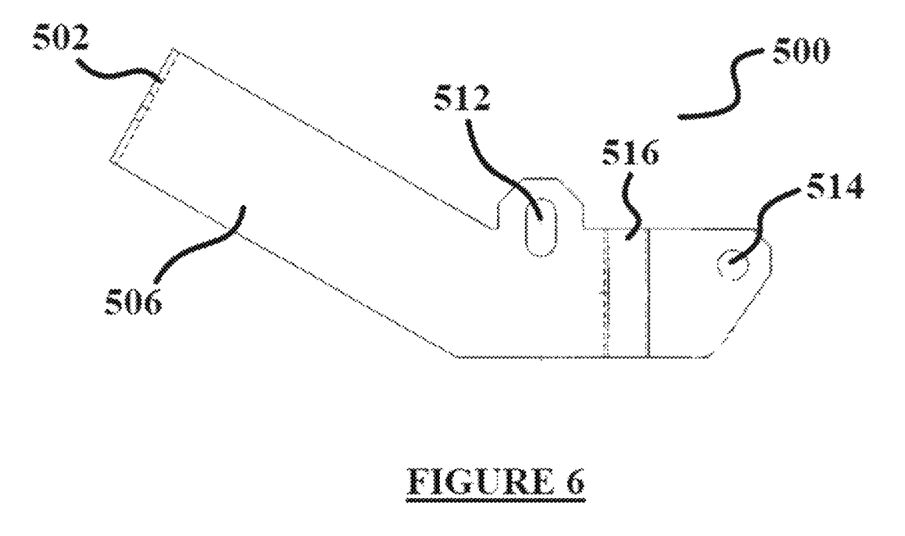
FIG. 6 shows a back view of a three-point installation bracket of the current disclosure.

FIG. 5 shows three-point installation bracket 500 in a side view. FIG. 6 shows a back view of bracket 500. Bracket 500 may include shoulder belt/harness engagement ledge 502, which defines shoulder belt/harness engagement orifice 504, support arm 506, first positioning ledge 508, and end engagement ledge 510. In use, shoulder belt/harness engagement ledge 502 is affixed to a shoulder belt/harness via a bolt or screw through shoulder belt/harness engagement orifice 504, or a weld or other means as known in the art, to seat the seat belt shoulder harness behind the user's shoulder without requiring the vehicle to provide support architecture that would interfere with using the vehicle in convertible mode. Support arm 506 serves to run essentially perpendicular to the base of the automobile to position first car engagement orifice 512 and second car engagement orifice 514 to be positioned adjacent prior existing holes in the car frame.

To wit, the current disclosure may be affixed to a car without requiring the addition of new holes into the car frame via drilling or other means. One simply matches bracket 500, which is shaped to contour to the existing factor-made holes in the frame/side of the vehicle (these holes typically exist to support/position the power cylinders that raise and lower the convertible roof). The specific style and shape of contoured profile 503 is of critical importance to car collectors who wish to maintain their vehicles in "like new" or "factory" condition and do not wish to modify the cars existing structure/frame by drilling holes, welding, cutting, etc. Further, bracket 500 may include positioning second positioning ledge 516. Positioning ledges 508 and 516 help to form the bracket to mirror the frame of the car by providing "kick outs" to distance bracket body 501 from the car frame to allow bracket 500 to have a contoured profile 503 that mirrors the structure of the particular vehicle make to which bracket 500 is being installed. Each bracket 500 may be made to contour the frame of the specific year and car to bolt into the factory holes. The bends are determined by the contours of the specific car's frame. For instance, a 1967-69 Camaro will have a different fender/frame style than a 1967 Chevelle, thus requiring variations in bracket body 501 and contour profile 503 in order for the bracket to match the existing holes, and the positioning of same, vis-à-vis the frame of the automobile.

Another important aspect of the current disclosure is that bracket 500 will not shift position during operation of the vehicle's convertible roof. Once affixed to the particular vehicle frame that matches shaped contoured profile 503, the point of attachment does not move, shift, or otherwise change position. This allows for increased safety as well as prevents having to have the three-point seat belt installation to have to compensate for movement of the convertible roof.

Bracket 500 may be sold in a set that includes completely assembled driver and passenger side seat belts, two year-and-vehicle specific brackets (because various models may have frame/structure differences from model to model and year to year), two female ends with your choice of buckle style, Grade 8 bolts, and all other necessary installation hardware and instructions. Thus, the set of front three-point seat belts bolt into all existing factory holes in, for purposes of example only and not intended to be limiting, a 1967. Chevelle Convertible. The brackets that bolt into the floor may be pre-assembled on each reel at the correct angle, are made out of stainless steel, may be e-coated black. Brackets 500 that bolt into the structure of the car to create the third point seatbelt point may be made out of stainless steel, but may not be e-coated. The belts are sewn according to the vehicle manufacturer's pattern to increase their strength, and may come in various colors to match the vehicle interior.

The length and width of each bracket may be determined by the year and make of car, as each bracket may be made to fit the contours of the car's frame. In one instance, the length has to be at least 10.28" to bring the top of the bracket above or even with the front seat occupant's shoulder when installed.

Figure 7:
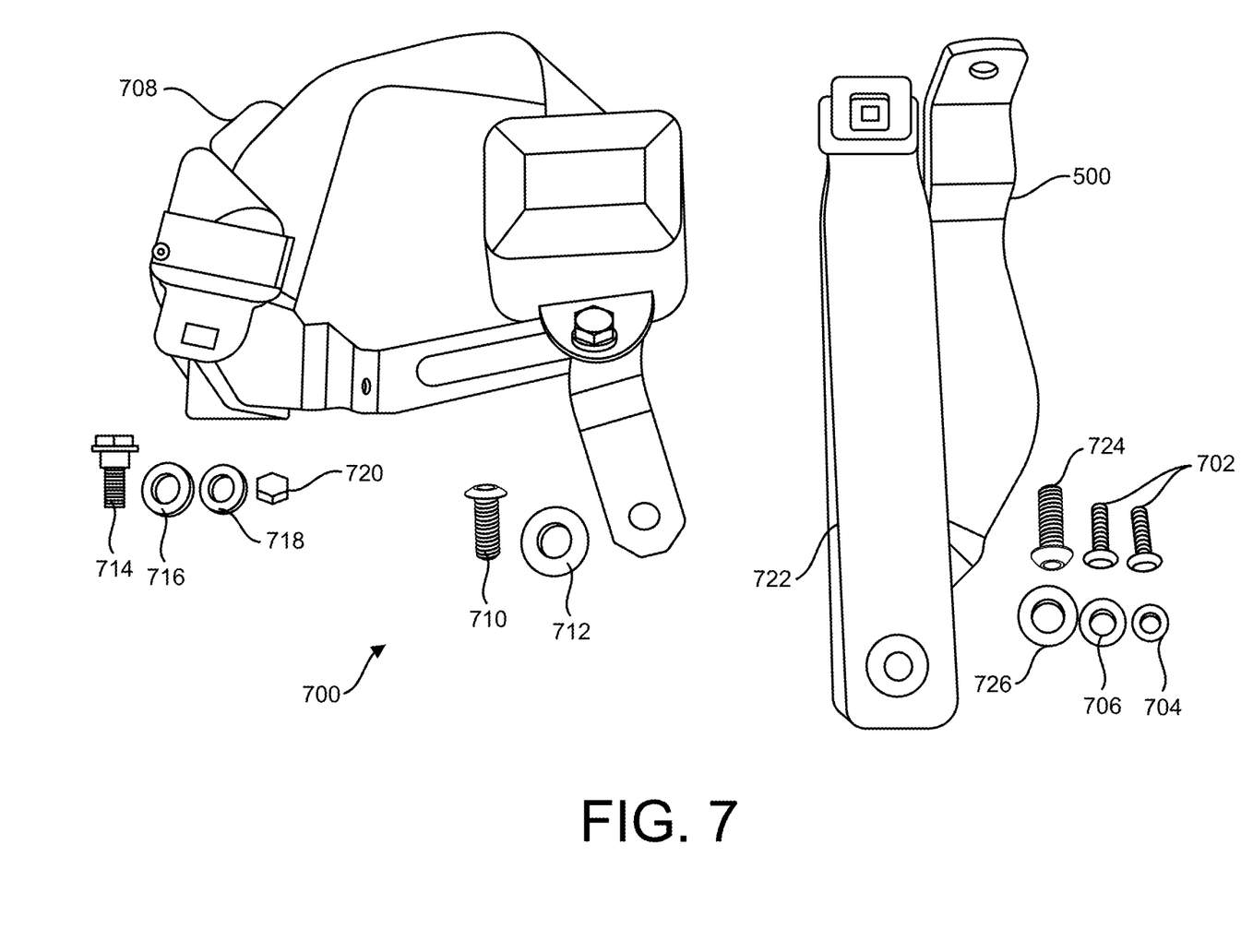
FIG. 7 shows the components of one embodiment of a kit for installing a three-point installation bracket of the current disclosure.
Figure 8:
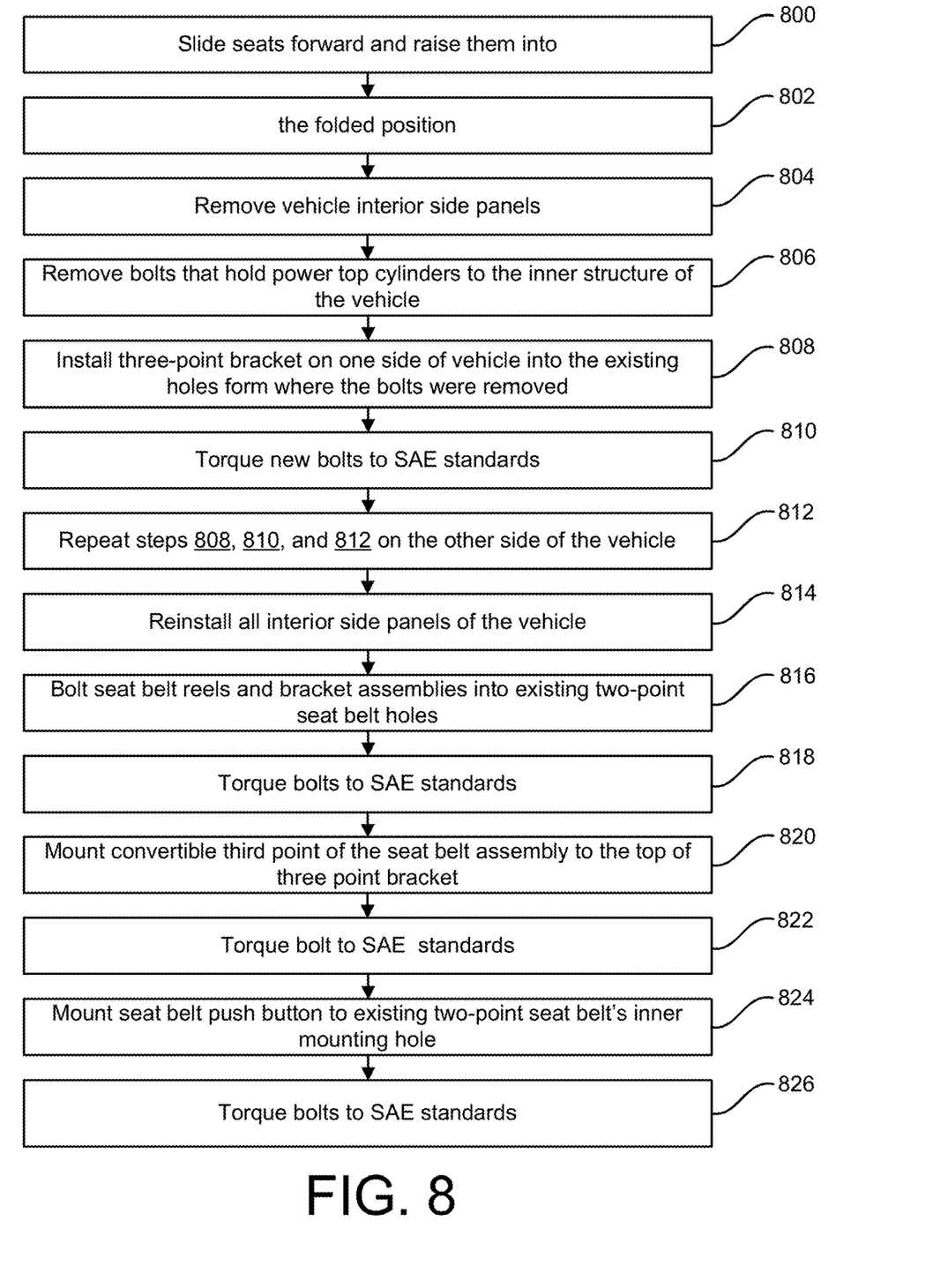
FIG. 8 shows a method for installing three-point installation brackets of the current disclosure.
Figure 10:
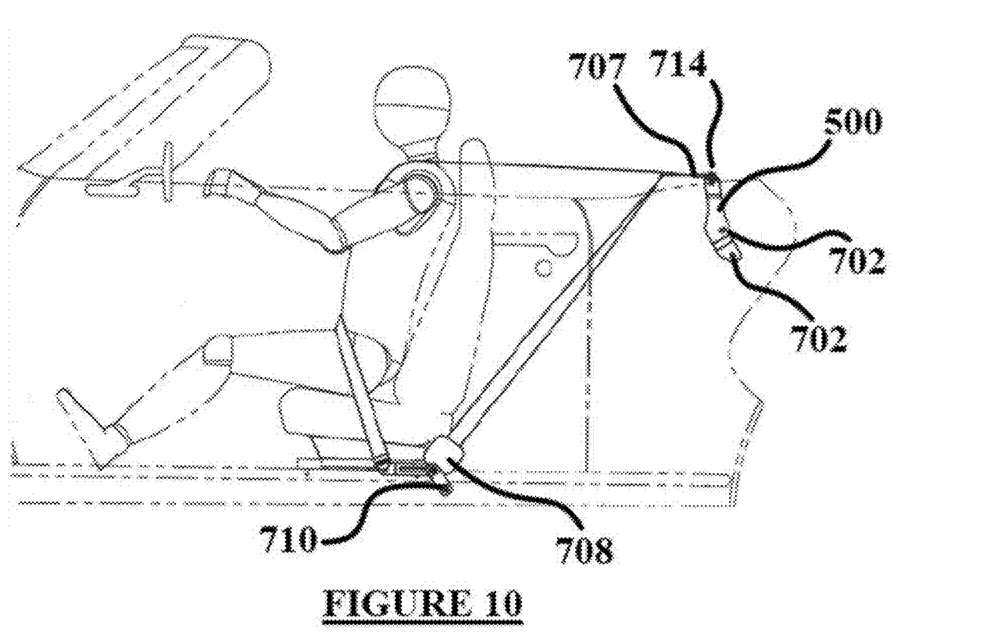
FIG. 10 shows a side view of a three-point installation bracket of the current disclosure installed in a vehicle.

Referring to FIG. 7, which shows a bracket installation kit 700, and FIG. 8, which shows method 800 of installation for bracket 500 of the current disclosure. At step 802, one may slide the front seats forward and raise them to the folded position. Step 804 includes removing the interior side panels from the vehicle. At 806, one removes the bolts, typically at least two or more, that hold the power top cylinders to the inner structure of the vehicle. At 808, using first bolts 702 and, lock washer 704 and flat washer 706 for each bolt 702, one installs three-point bracket 500 on one side of the vehicle into the existing holes from the previously removed bolts from step 806. At step 810, one torques bolts 702 to the SAE standards required to affix them to the inner structure of the car. At step 812, one repeats steps 806, 808, and 810 on the other side of the vehicle. At step 814, one reinstalls all interior side panels of the vehicle. At step 816, one bolts the convertible three-point seat belt reels and bracket assemblies 708 into the existing 2-point seat belts holes located in the floor pan, using second bolt 710 and second washer 712 on the outside edge of each front seat. At 818, bolt 710 is also torqued to SAE standards. At step 820, one mounts the convertible third point D-ring seat belt bracket 707, see FIG. 9, of the convertible seat belt assemblies 708 to the top of the 3-point mounting brackets 500 that were previously installed in Step 808 using shoulder bolt 714, first shoulder washer 716 and second shoulder washer 718 and lock nut 720. Step 822 has shoulder bolt 714 torqued to SAE standards. At step 824, one mounts each seat belt push button end 722 of the three-point convertible seat belt to the existing 2-point seat belt's inner mounting hole into the body of the car using push button end bolt 724 and push button washer 726. At step 826, seat belt push button bolt 724 is also torqued to SAE standards. FIGS. 9 and 10 show bracket 500 installed into a vehicle.

Figure 11:
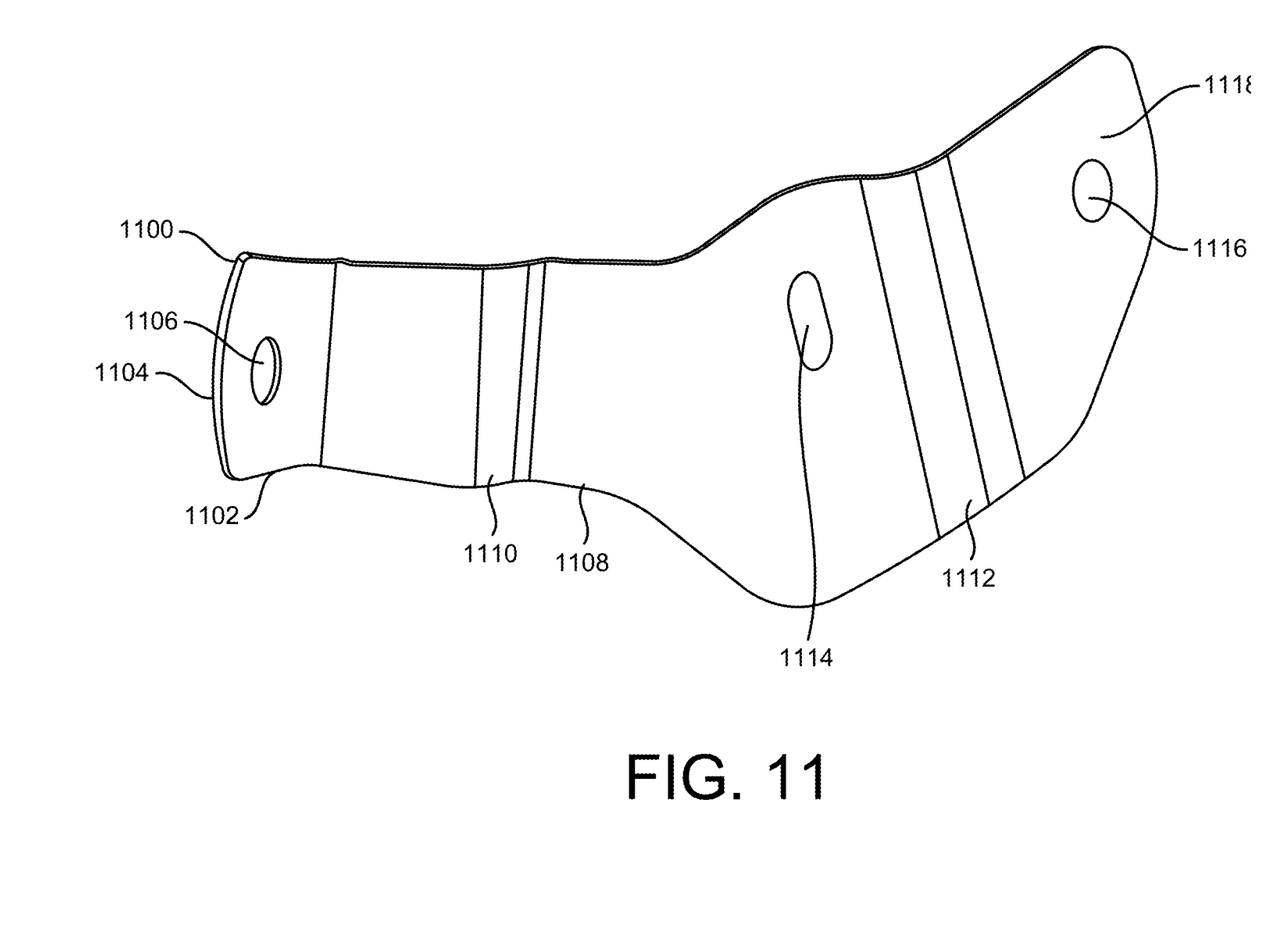
FIG. 11 shows a front view of a further embodiment of a three-point installation bracket of the current disclosure.
Figure 12:
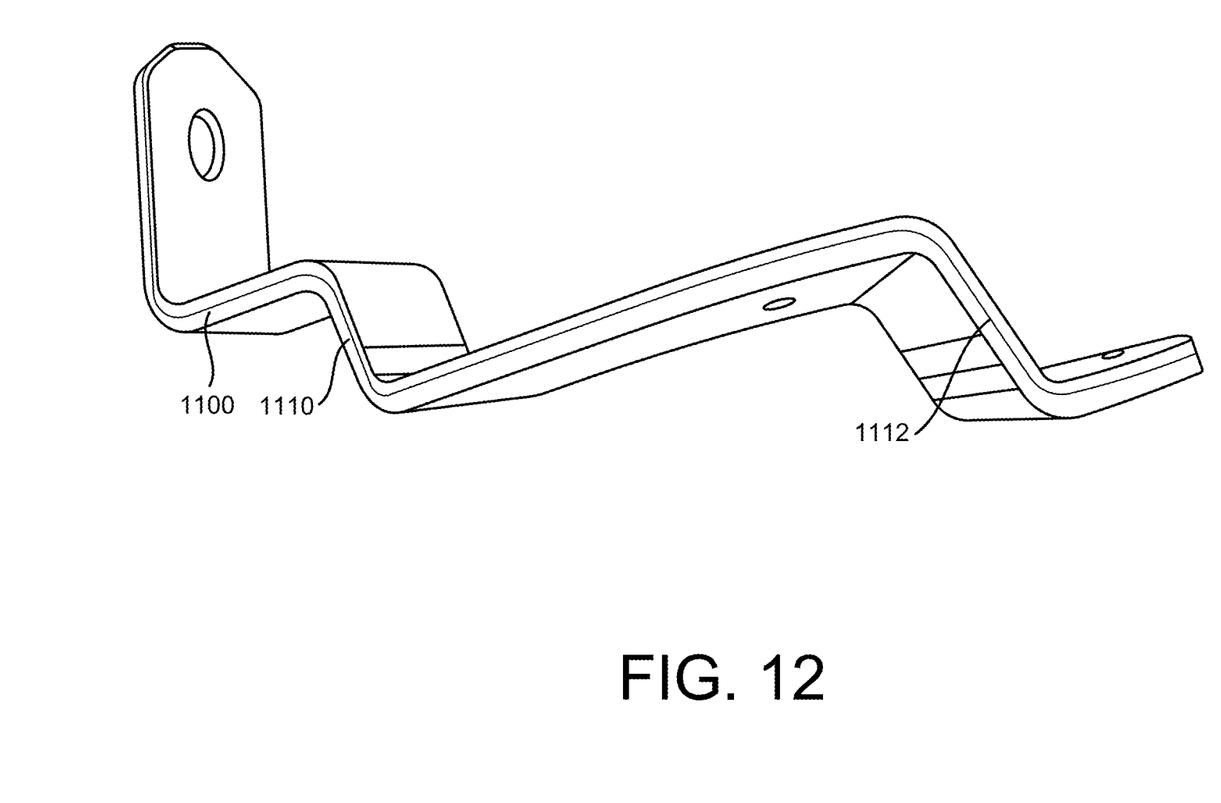
FIG. 12 shows a side view of a further embodiment of a three-point installation bracket of the current disclosure.
Figure 13:
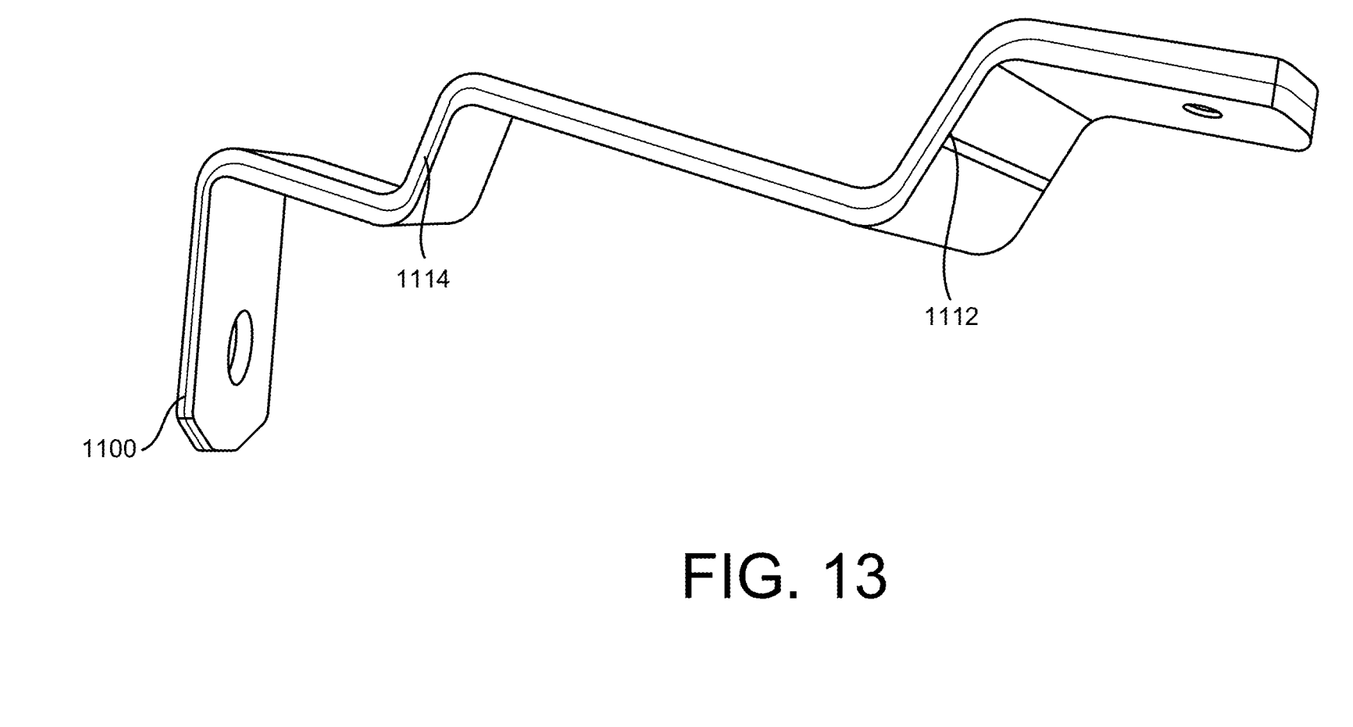
FIG. 13 shows an opposite side view of a further embodiment of a three-point installation bracket of the current disclosure.

FIG. 11 shows alternative bracket 1100 with alternative contoured profile 1102. Here, alternative contoured profile 1102 is shaped to fit a 1967. Firebird Convertible. Thus, bracket 1100 has a different shape and profile than bracket 500, which is contoured to fit a different make/model of vehicle. Alternative bracket 1100 may include alternative shoulder belt engagement ledge 1104, may define alternative shoulder belt engagement orifice 1106, alternative support arm 1108, form alternative first positioning ledge/bend 1110, alternative second positioning ledge/bend 1112, alternative first engagement orifice 1114, alternative second engagement orifice 1116, and alternative end engagement section 1118. FIG. 12 shows a side view of FIG. 11. FIG. 13 shows an opposite side view of FIG. 11. The bends in each bracket vary from car to car depending on year and make because each bracket is made to contour specifically to the car's frame. In one instance, the minimum width may be 2.28". However, the exact length and width of each bracket is determined by the specific car frame's contours.

While the present subject matter has been described in detail with respect to specific exemplary embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art using the teachings disclosed herein.

What is claimed is:

1. A method for installing a three-point seat belt harness into a convertible vehicle comprising:

removing at least one side panel from the convertible vehicle to reveal a section of a frame of the convertible vehicle;

removing at least one bolt from the frame of the convertible vehicle to provide an at least partially empty original factory-created bolt hole in the frame of the convertible vehicle;

installing a first three-point installation bracket having a contour profile that aligns with the at least one empty original factory-created bolt hole, wherein the three-point installation bracket is configured to comprise;

a shoulder harness engagement ledge defining at least one shoulder belt/harness engagement orifice;

a support arm, substantially perpendicular to the shoulder harness engagement ledge, defining at least one first engagement orifice;

at least one positioning ledge formed at an angle to the support arm;

an engagement ledge, extending from the at least one positioning ledge defining at least one second engagement orifice, wherein the engagement ledge is substantially perpendicular to the shoulder harness engagement ledge, wherein the at least one shoulder belt/harness engagement orifice is oriented perpendicular to the at least one first engagement orifice and the at least one second engagement orifice and the at least one first engagement orifice and the at least one second orifice are configured substantially parallel to one another;

installing a three-point seat belt reel into the convertible vehicle;

mounting a convertible seat belt assembly to the first three-point installation bracket;

mounting a seat belt push button into the convertible vehicle; and wherein no holes are drilled into the convertible vehicle frame.

2. The method of claim 1, further comprising wherein a shoulder harness of the three-point seat belt reel remains in place when the convertible vehicle has a convertible roof stored or otherwise removed.

3. The method of claim 1, further comprising wherein the contoured profile of the first three point installation bracket is configured to match a specific make and model of vehicle.

4. The method of claim 1, wherein the three-point seat belt reel is configured to be secured via insertion of bolts into bolt holes used to secure a two point seat belt in the vehicle.

5. The method of claim 1, wherein the seat belt push button is affixed to an inner mounting hole for a two point seat belt system of the vehicle.

6. The method of claim 1, wherein a second three-point installation bracket is installed into the vehicle.

7. The method of claim 1, further comprising affixing the convertible seat belt assembly to the shoulder harness engagement ledge of the three-point installation bracket.

8. The method of claim 1, further comprising that the three-point installation bracket affixment point to the vehicle frame does not change position when the convertible vehicle activates or otherwise repositions a convertible roof.

9. A three-point installation bracket comprising:
   a bracket body having a contoured profile having at least one orifice configured to match at least one existing original factory-created hole in a vehicle interior;
   a shoulder harness engagement ledge defining at least one shoulder belt/harness engagement orifice;
   a support arm substantially perpendicular to the shoulder harness engagement ledge defining at least one first engagement orifice;
   at least one positioning ledge formed at an angle to the support arm;
   at least one second engagement orifice, defined in an engagement section extending from the at least one positioning ledge wherein the engagement section is positioned substantially perpendicular to the shoulder harness engagement ledge, positioned for engaging the at least one existing hole in vehicle frame;
   wherein the at least one shoulder belt/harness engagement orifice is oriented perpendicular to the at least one first engagement orifice and the at least one second engagement orifice and the at least one first engagement orifice and the at least one second orifice are configured substantially parallel to one another.

10. The three-point installation bracket of claim 9, further comprising at least two positioning ledges.

11. The three-point installation bracket of claim 9, further comprising wherein three-point installation bracket affixment point to the vehicle frame does not change position when a convertible vehicle activates or otherwise repositions a convertible roof.

12. The three-point installation bracket of claim 9, further comprising wherein the contoured profile is configured to match a specific make and model of vehicle.

13. A kit for converting a two point seat belt harness in a convertible vehicle to a three-point harness comprising:
   at least one three-point installation bracket having a contoured profile, wherein the three point installation bracket comprises;
      a shoulder harness engagement ledge defining at least one shoulder belt/harness engagement orifice;
      a support arm substantially perpendicular to the shoulder harness engagement ledge defining at least one first engagement orifice;
      at least one positioning ledge formed at an angle to the support arm;
      an engagement ledge extending from the at least one positioning ledge defining at least one second engagement orifice, wherein the engagement ledge is substantially perpendicular to the shoulder harness engagement ledge,
      wherein the at least one shoulder belt/harness engagement orifice is oriented perpendicular to the at least one first engagement orifice and the at least one second engagement orifice and the at least one first engagement orifice and the at least one second orifice are configured substantially parallel to one another;
   wherein the contoured profile is configured to match a specific make and model of vehicle;
   at least one convertible three-point seat belt reel; and
   at least one seat belt push button end.

14. The kit of claim 13, wherein the three-point seat belt reel is configured to have a shoulder belt configured to engage the shoulder harness engagement ledge of the at least one three-point installation bracket.

* * * * *